United States Patent
Park et al.

(10) Patent No.: US 7,768,252 B2
(45) Date of Patent: Aug. 3, 2010

(54) SYSTEMS AND METHODS FOR DETERMINING SENSING THRESHOLDS OF A MULTI-RESOLUTION SPECTRUM SENSING (MRSS) TECHNIQUE FOR COGNITIVE RADIO (CR) SYSTEMS

(75) Inventors: Jongmin Park, Atlanta, GA (US);
Kyutae Lim, Alpharetta, GA (US);
Chang-Ho Lee, Marietta, GA (US);
Haksun Kim, Daejeon (KR); Joy Laskar, Marietta, GA (US)

(73) Assignees: Samsung Electro-Mechanics (KR);
Georgia Tech Research Corporation, Atlanta, GA (US)

( * ) Notice: Subject to any disclaimer, the term of this patent is extended or adjusted under 35 U.S.C. 154(b) by 339 days.

(21) Appl. No.: 12/034,570

(22) Filed: Feb. 20, 2008

(65) Prior Publication Data

US 2008/0214130 A1 Sep. 4, 2008

Related U.S. Application Data

(60) Provisional application No. 60/892,381, filed on Mar. 1, 2007.

(51) Int. Cl.
*G01R 23/00* (2006.01)
(52) U.S. Cl. .................................................. 324/76.19
(58) Field of Classification Search ............... 324/76.19
See application file for complete search history.

(56) References Cited

U.S. PATENT DOCUMENTS

| | | | | | |
|---|---|---|---|---|---|
| 3,715,509 A | * | 2/1973 | Dawson | ...................... | 702/76 |
| 4,563,638 A | * | 1/1986 | Dunn | ...................... | 324/76.29 |
| 4,682,361 A | * | 7/1987 | Selbach et al. | ............... | 704/233 |
| 5,257,211 A | * | 10/1993 | Noga | ........................... | 702/60 |
| 5,515,300 A | * | 5/1996 | Pierce | ........................ | 702/190 |
| 6,507,023 B1 | * | 1/2003 | Parham et al. | .......... | 250/339.15 |
| 7,315,172 B2 | * | 1/2008 | Zeidan | ........................ | 324/614 |
| 2004/0028003 A1 | * | 2/2004 | Diener et al. | ............... | 370/319 |
| 2007/0092045 A1 | * | 4/2007 | Woo et al. | .................... | 375/343 |

OTHER PUBLICATIONS

Olivieri et al., "A Scalable Dynamic Spectrum Allocation System with Interference Mitigation for Teams of Spectrally Agile Software Defined Radios", First IEEE International Symposium on New Frontiers in Dynamic Spectrum Access Networks, pp. 170-179, Publication year 2005.*

* cited by examiner

*Primary Examiner*—Timothy J Dole
*Assistant Examiner*—Benjamin M Baldridge
(74) *Attorney, Agent, or Firm*—Sutherland Asbill & Brennan LLP (57) ABSTRACT

Systems and methods may be provided for threshold determinations for spectrum sensing. The systems and methods may include receiving a false alarm rate, where the false alarm rate is associated with false occupancy identifications of a spectrum segment, determining a noise floor as a function of a noise figure and characteristics of a multi-resolution spectrum sensing (MRSS) window, and calculating a sensing threshold based at least in part upon the false alarm rate and the noise floor. The systems and methods may also include determining whether a portion of an RF spectrum is occupied based at least in part on the calculated sensing threshold.

17 Claims, 8 Drawing Sheets

FIGURES OF MERIT OF $\cos^\alpha(\pi f_w t)$ WINDOW

| Window | Highest Sidelobe (dBc) | Equiv. Noise BW (Hz) | 3-dB BW (Hz) | 6-dB BW (Hz) |
|---|---|---|---|---|
| $\cos(\pi f_w t)$ | -23 | $1.23 f_w$ | $1.20 f_w$ | $1.65 f_w$ |
| $\cos^2(\pi f_w t)$ | -32 | $1.50 f_w$ | $1.44 f_w$ | $2.00 f_w$ |
| $\cos^3(\pi f_w t)$ | -39 | $1.73 f_w$ | $1.66 f_w$ | $2.32 f_w$ |
| $\cos^4(\pi f_w t)$ | -47 | $1.94 f_w$ | $1.86 f_w$ | $2.59 f_w$ |

COMPARISON OF THEORETICAL AND SIMULATION VALUE ON THE THRESHOLD LEVEL DETERMINATION WITH $\cos^4(\pi f_w t)$ WINDOW, $f_w = 100$ kHz, AND $P_{FA} = 0.1$

| | $N_{AVG}$ | Theoretical | Simulation | Error (dB) |
|---|---|---|---|---|
| $\mu_N$ (dBm) | All | -113.63 | -113.62 | -0.01 |
| $\sigma_N$ (dB) | 1 | 5.57 | 5.55 | -0.02 |
| | 10 | 1.76 | 1.74 | -0.02 |
| | 100 | 0.57 | 0.54 | -0.03 |
| | 1000 | 0.18 | 0.17 | -0.01 |
| $P_{TH}$ (dBm) | 1 | -107.50 | -107.40 | 0.10 |
| | 10 | -111.69 | -111.40 | 0.29 |
| | 100 | -113.02 | -112.80 | 0.22 |
| | 1000 | -113.44 | -113.40 | 0.04 |

SYSTEMS AND METHODS FOR DETERMINING SENSING THRESHOLDS OF A MULTI-RESOLUTION SPECTRUM SENSING (MRSS) TECHNIQUE FOR COGNITIVE RADIO (CR) SYSTEMS

RELATED APPLICATION

This application claims priority to U.S. Provisional Application No. 60/892,381, filed Mar. 1, 2007, and entitled "Systems and Methods for Determining Sensing Thresholds of a Multi-Resolution Spectrum Sensing (MRSS) Technique for Cognitive Radio (CR) Systems," which is hereby incorporated by reference in its entirety as if fully set forth herein.

FIELD OF THE INVENTION

Example embodiments of the invention relates generally to cognitive radios, and more particularly to determining sensing thresholds of a multi-resolution spectrum sensing (MRSS) technique.

SUMMARY OF THE INVENTION

According to an example embodiment of the invention, spectrum sensing methods such as multi-resolution spectrum sensing (MRSS) may be utilized to detect occupancy in a dynamic spectrum. MRSS may be an energy detection method that may not require explicit filter banks in adjusting the resolution bandwidth. In accordance with an embodiment of the invention, systems and methods may be provided for determining sensing thresholds for use with MRSS. These thresholds may be based upon an acceptable false alarm rate and MRSS parameters such as the type and duration of a window and the number of averaging.

According to an example embodiment of the invention, there may be a method for threshold determinations for spectrum sensing, The method may include receiving a false alarm rate, where the false alarm rate is associated with false occupancy identifications of a spectrum segment, determining a noise floor as a function of a noise figure and characteristics of a multi-resolution spectrum sensing (MRSS) window, and calculating a sensing threshold based at least in part upon the false alarm rate and the noise floor.

According to another example embodiment of the invention, there may be a system for spectrum sensing. The system may include an antenna for receiving a portion of a radio frequency (RF) spectrum, and a spectrum sensing module. The spectrum sensing module may be operative to receive a false alarm rate, where the false alarm rate is associated with false occupancy identifications of a spectrum segment, determine a noise floor as a function of a noise figure and characteristics of a multi-resolution spectrum sensing (MRSS) window, and calculate a sensing threshold based at least in part upon the false alarm rate and the noise floor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
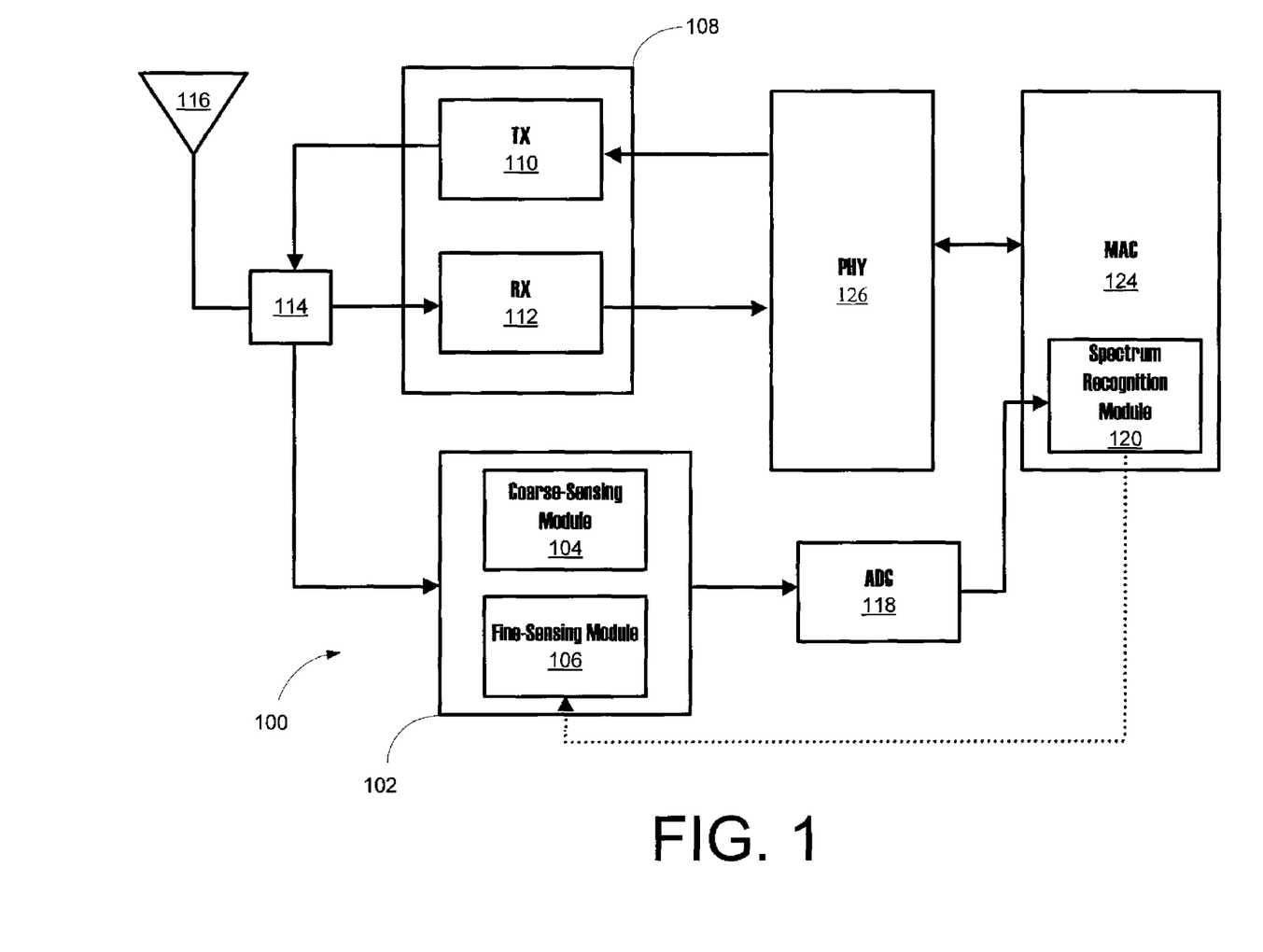
FIG. 1 illustrates a functional block diagram of an example cognitive radio system in accordance with an example embodiment of the invention.

According to an embodiment of the invention, systems and methods may be provided for determining one or more appropriate sensing threshold levels for use with multi-resolution spectrum sensing (MRSS) utilized by example cognitive radios for determining occupancy (e.g., vacant or occupied) within one or more spectrum channels. An example cognitive radio system that utilizes MRSS and associated sensing thresholds will be presented prior to provided example systems and methods for determining the sensing thresholds. In an example cognitive radio system, the MRSS sensing thresholds may be utilized in sensing modules such as coarse-sensing modules, according to an example embodiment of the invention, A. Example System Overview FIG. 1 illustrates a block diagram of an example cognitive radio system in accordance with an embodiment of the invention. As shown, FIG. 1 illustrates a cognitive radio 100 that may include an antenna 116, a transmit/receive switch 114, a radio front end 108, an analog wideband spectrum-sensing module 102, an analog to digital converter 118, a signal processing module 126, and a medium access control (MAC) module 124.

During operation of the cognitive radio system of FIG. 1, which will be discussed in conjunction with the flowchart of FIG. 2, radio frequency (RF) input signals may be received by the antenna 116. In an example embodiment of the invention, the antenna 116 may be a wideband antenna operable over a wide frequency range, perhaps from several megahertz (MHz) to the multi-gigahertz (GHz) range. The input signals received by the antenna 116 may be passed or otherwise provided to the analog wideband spectrum-sensing module 102 via the transmit/receive switch 114 (block 202). The spectrum-sensing module 102 may include one or both of a coarse-sensing module 104 and a fine-sensing module 106, or yet other example spectrum sensing modules for performing the spectrum sensing methods and calculations described herein. The coarse-sensing module 104 may detect the existence or presence of suspicious spectrum segments (e.g., potentially utilized spectrum segments). The coarse-sensing module may utilize one or more thresholds $P_{TH}$ as described herein for detecting the suspicious spectrum segments, according to an example embodiment of the invention. The fine-sensing module 106 may scrutinize or otherwise analyze the detected suspicious spectrum segments to determine the particular signal types and/or modulation schemes utilized therein.

Referring back to FIG. 2, the coarse-sensing module 104 may initially determine the spectrum occupancy for the received input signal using one or more thresholds $P_{TH}$ described herein (block 204). The spectrum occupancy information may be converted from analog form to digital form by the analog-to-digital (A/D) converter 118, which may be a low-speed A/D converter (AD C) in an example embodiment of the invention. The digital spectrum occupancy information provided by the AID converter 118 may be received by the spectrum recognition module 120 in the medium access control (MAC) module 124. The spectrum recognition module 120 may perform one or more calculations on the digital spectrum occupancy information to recognize whether one or more spectrum segments are currently in use or occupied by others. The spectrum recognition module 120 may be implemented in hardware, software, or a combination thereof In some instances, based on the recognized spectrum segments, the MAC module 124 may request a more refined search of the spectrum occupancy (block 206). In such a case, the fine-sensing module 106 may be operative to identify the particular signal types and/or modulation schemes utilized within at least a portion of the spectrum occupancy (block 208). The information identifying the signal types and/or modulation schemes may then be digitized by the AID converter 118, and provided to the spectrum recognition module 120. Information about the signal type and/or modulation scheme may be necessary to determine the impact of interferers within the detected suspicious spectrum segments.

In accordance with an embodiment of the invention, the spectrum recognition module 120 may compare information from the coarse-sensing module 104 and/or fine-sensing module 106 with a spectrum usage database (block 210) to determine an available (e.g., non-occupied or safe) spectrum slot (block 212). The spectrum usage database may include information regarding known signal types, modulation schemes, and associated frequencies. Likewise, the spectrum usage database may include one or more thresholds for determining whether information from the coarse-sensing module 104 and/or fine-sensing module 106 is indicative of one or more occupied spectrum. According to an example embodiment of the invention, the spectrum usage database may be updated based upon information received from an external source, including periodic broadcasts form a base station or other remote station, removable information stores (e.g., removable chips, memory, etc.), Internet repositories. Alternatively, the spectrum usage database may be updated based upon internally, perhaps based upon adaptive learning techniques that may involve trial and error, test configurations, statistical calculations, etc.

The sensing results determined by the spectrum recognition module 120 may be reported to the controller (e.g., spectrum allocation module) of the MAC module 124, and permission may be requested for a particular spectrum use (block 214). Upon approval from the controller, the reconfiguration block of the MAC module 124 may provide reconfiguration information to the radio front end 108 via the signal processing module 126 (block 218). In an example embodiment of the invention, the radio front-end 108 may be reconfigurable to operate at different frequencies ("frequency-agile"), where the particular frequency or frequencies may depend upon the selected spectrum segments for use in communications by the cognitive radio 100. In conjunction with the frequency-agile front-end 108, the signal processing module 126, which may be a physical layer signal processing block in an example embodiment, may enhance the cognitive radio's 100 performance with adaptive modulation and interference mitigation technique.

B. Example MRSS Simulation

Figure 2:
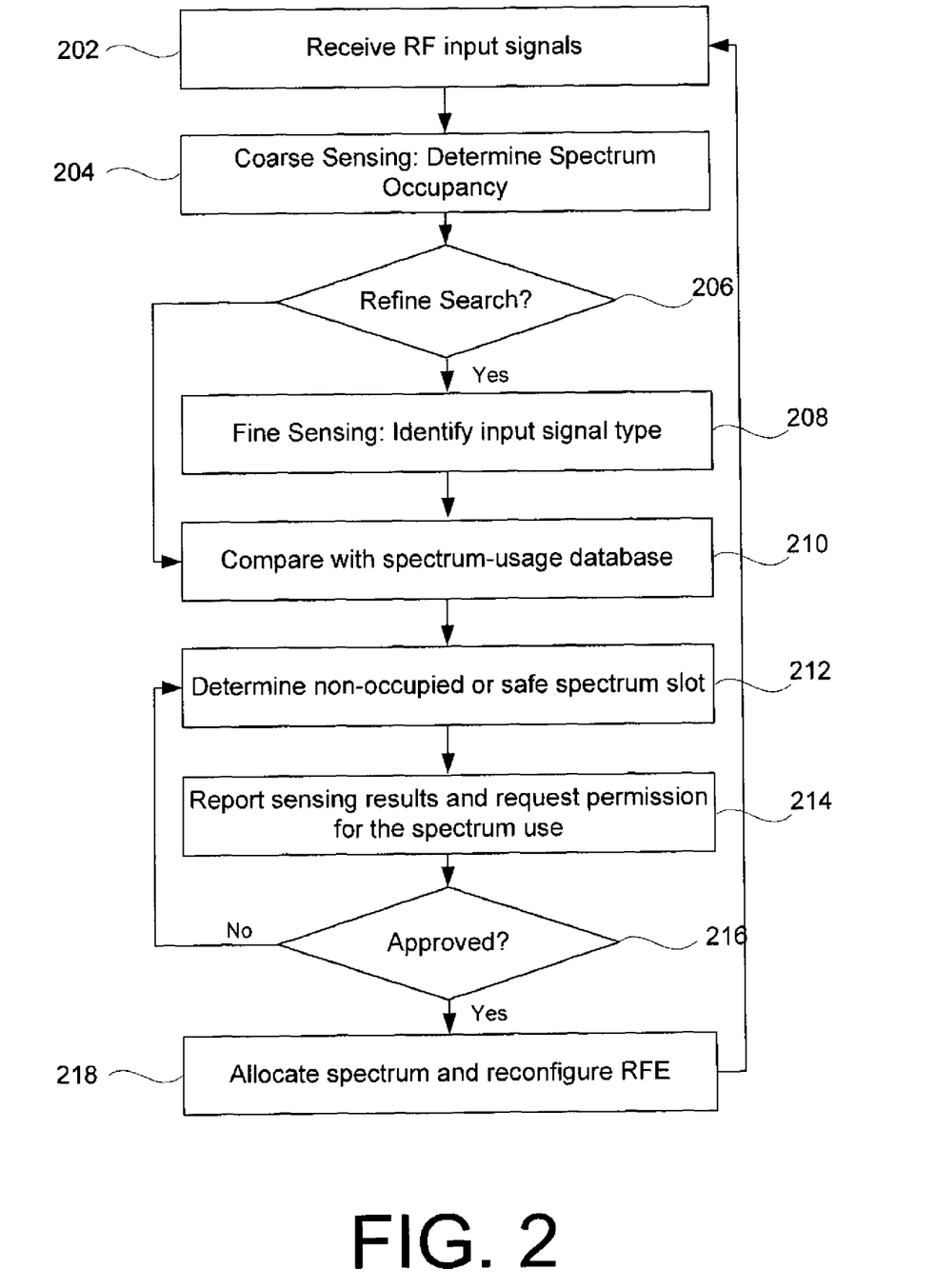
FIG. 2 illustrates an example flowchart of the cognitive radio system of FIG. 1, according to an example embodiment of the invention.

According to an example embodiment of the invention, spectrum sensing such as MRSS implemented in a coarse-sensing module 104, may involve determining whether one or more spectrum channels may be occupied by primary users, as illustratively provided in block 204 of FIG. 2. According to an example embodiment of the invention, a coarse-sensing module may determine spectrum occupancy by testing two hypotheses ($H_0$ or $H_1$), as provided by (1) below, and providing one of two decisions of spectrum occupancy ($D_0$ or $D_1$), as provided by (2) below.

$$\begin{cases} H_0: \text{Channel is vacant} \\ H_1: \text{Channel is occupied} \end{cases} \quad (1)$$

$$\begin{cases} D_0: \text{Channel is vacant} \\ D_1: \text{Channel is occupied} \end{cases} \quad (2)$$

According to an example embodiment of the invention, the spectrum sensing by a coarse-sensing module may involve three probabilities: (i) a probability of a false alarm ($P_{FA}$), (ii) a probability of a misdetection ($P_{MD}$), (iii) and a probability of detection ($P_D$). According to an example embodiment of the invention, the probability of a false alarm ($P_{FA}$), as provided in (3) below, may be the probability that the coarse-sensing module determining that a channel is occupied when it is actually vacant. On the other hand, the probability of a misdetection ($P_{MD}$), as provided in (4) below, may be the probability of the coarse-sensing module determining that a channel is vacant when it is actually occupied. The probability of detection ($P_D$), as provided in (5) below, may be the desired detection probability. As shown by (5), the probability of detection ($P_D$) may be defined to be 1 minus the probability of probability of a misdetection ($P_{MD}$), according to an example embodiment of the invention.

$$P_{FA} = P(D_1 | H_0) \quad (3)$$

$$P_{MD} = P(D_0 | H_1) \quad (4)$$

$$P_D = 1 - P_{MD} \quad (5)$$

According to an embodiment of the invention, an occupancy decision may made by the coarse-sensing module comparing the MRSS result to a pre-defined threshold level, $P_{TH}$. For example, the MRSS result may be correlation values representing a correlation between a received time-variant signal and a modulated basis waveform (e.g., wavelet pulses) that serves as a window. If the threshold level $P_{TH}$ is set too high, the false alarm rate ($P_{FA}$) may be low at the expense of a lower probability of detection ($P_D$) Accordingly, the threshold level $P_{TH}$ may be set based upon an acceptable false alarm rate ($P_{FA}$), according to an example embodiment of the invention. For example, if the acceptable false alarm rate ($P_{FA}$) is 0.10 (e.g., 10%), then the threshold level may be set such that the false alarm rate ($P_{FA}$) does not exceed 0.10. As shown in (3), the false alarm rate ($P_{FA}$) may be based on the MRSS result when there is no signal in the channel of interest. Accordingly, the determination of threshold level $P_{TH}$ may be affected by the MRSS result distribution on the noise power measurement.

C. Example Statistical Distribution of MRSS on Noise Power

According to an example embodiment of the invention, the MRSS result distribution on the noise power measurement may be analyzed to determine an appropriate MRSS threshold level. According to an example embodiment of the invention, the noise power measurement may be modeled as white Gaussian noise. The envelope voltage v of white Gaussian noise may have a Rayleigh distribution with a power density function $f_v(v)$ (pdf), as provided below in (6).

$$f_v(v) = \begin{cases} \frac{v}{\sigma^2}\exp\left(-\frac{v^2}{2\sigma^2}\right), & \text{if } v \geq 0 \\ 0, & \text{if } v < 0 \end{cases} \quad (6)$$

If the envelope voltage v is expressed in a logarithmic domain, perhaps in a dB scale, then the new variable x=20 log(v) would have a pdf $f_x(x)$, a mean $\mu_x$, and a standard deviation $\sigma_x$ as shown in (7), (8), and (9), respectively. According to an example embodiment of the invention, this representation in the logarithmic domain may sometimes be referred to as a log-compressed Rayleigh distribution.

$$f_X(x) = \frac{1}{10\log(e)}\exp\left[\frac{x}{10\log(e)} - \ln(2\sigma^2) - \exp\left(\frac{x}{10\log(e)} - \ln(2\sigma^2)\right)\right] \quad (7)$$

$$\mu_x = 10\log\left(\frac{2\sigma^2}{\exp(\gamma)}\right) \text{ (dB)}, \quad (8)$$

$\gamma \approx 0.5772$: Euler-Mascheroni constant $$\sigma_x = \frac{10\pi\log(e)}{\sqrt{6}} = 5.57 \text{ (dB)} \quad (9)$$

According to an example embodiment of the invention, a way of reducing the variation (or standard deviation) on the measured noise power may be to average the individually measured noise power. If the averaging is done in a logarithmic domain, the resultant pdf $f_{X,AVG}(x)$, mean $\mu_{AVG}$, and standard deviation $\sigma_{AVG}$ by averaging $N_{AVG}$ independent measurements may be as provided in (10), (11), and (12), respectively.

$$f_{X,AVG}(x) = \frac{\sqrt{N_{AVG}}}{10\log(e)}\exp\left[\frac{\sqrt{N_{AVG}}}{10\log(e)}x - \ln(2\sigma^2) - \exp\left(\frac{\sqrt{N_{AVG}}}{10\log(e)}x - \ln(2\sigma^2)\right)\right] \quad (10)$$

$$\mu_{AVG} = 10\log\left(\frac{2\sigma^2}{\exp(\gamma)}\right) \text{ (dB)} \quad (11)$$

$$\sigma_{AVG} = \frac{10\pi\log(e)}{\sqrt{6N_{AVG}}} = \frac{5.57}{\sqrt{N_{AVG}}} \text{ (dB)}. \quad (12)$$

D. Example Threshold Level Determination

Figure 3:
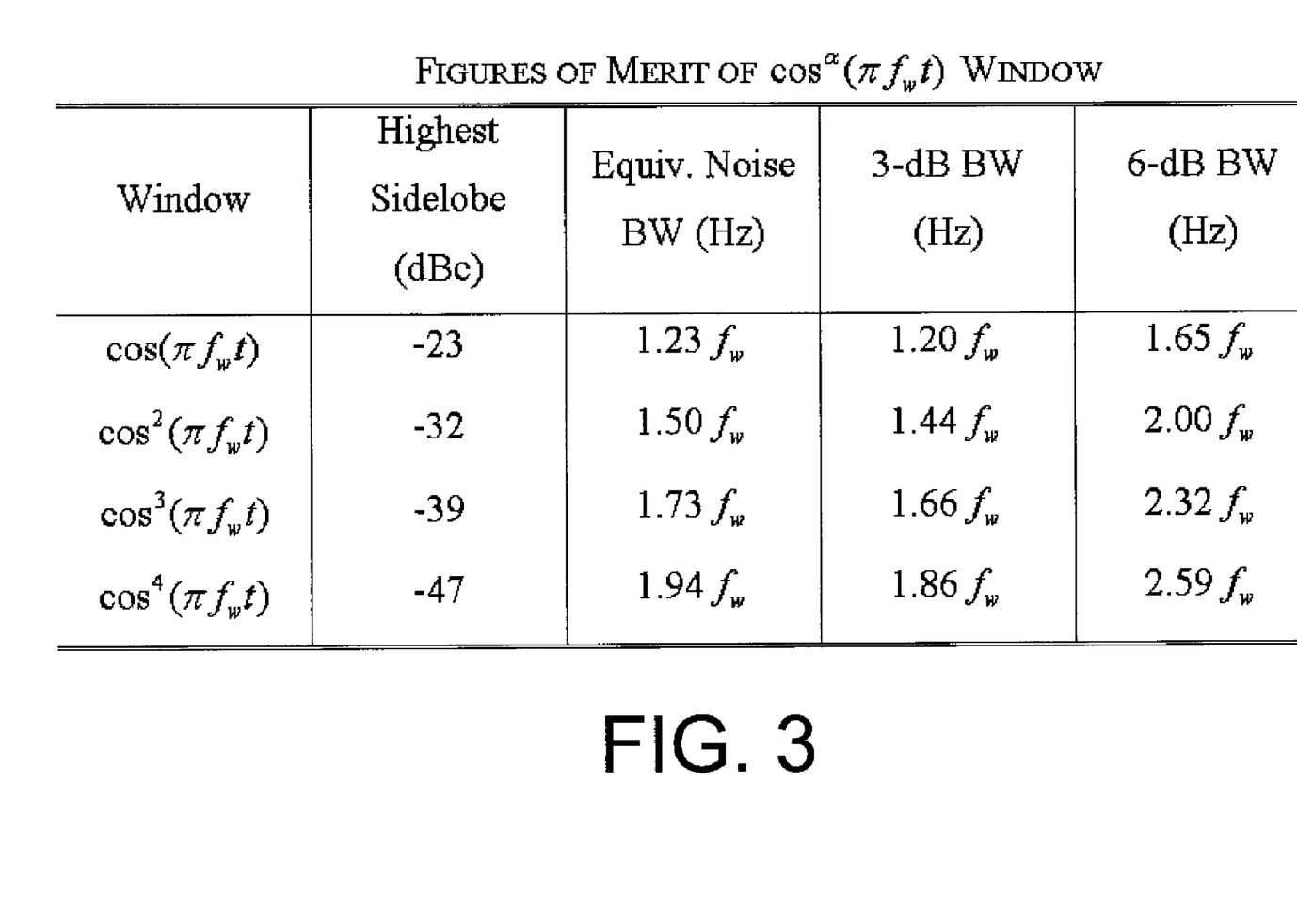
FIG. 3 illustrates some example $f_{NBW}$ values for $\cos^\alpha(\pi f_w t)$ windows, according to an example embodiment of the invention.

According to an example embodiment of the invention, a threshold level decision may begin with the noise floor estimation. The input-referred noise figure of the MRSS receiver path may be NF in a dB scale, according to an example embodiment of the invention. The window with the duration of $1/f_w$ may have an equivalent noise bandwidth of $f_{NBW}$. The equivalent noise bandwidth $f_{NBW}$ may be a bandwidth of an ideal rectangular filter which would accumulate the same noise power from white noise with same peak gain, thus indicating the bandwidth of a filter. FIG. 3 provides some equivalent noise bandwidth $f_{NBW}$ values for $\cos^\alpha(\pi f_w t)$ windows, where $\alpha=1, 2, 3$, or 4. The equivalent noise bandwidth $f_{NBW}$ may be proportional to window frequency $f_w$ and a window-specific factor. Even with a same window frequency, the equivalent noise bandwidth $f_w$ may be different depending on the window type or shape. As shown in FIG. 3, different window types can result in different equivalent noise bandwidths $f_w$. The actual average power $\mu$ of the noise floor may be as provided in (13). In (13), −174 (dBm/Hz) may be a thermal noise power and NF may be the additional noise contribution from the receiver. Accordingly, −174+NF may be a noise power within 1 Hz, and 10 $\log(f_{NBW})$ may be the noise power within the detection bandwidth of energy detection.

$$\mu = -174 + NF + 10\log(f_{NBW})(\text{dBm}). \quad (13)$$

According to an example embodiment of the invention, the signal processing of the envelope voltage v of white Gaussian noise in a logarithmic domain may result in an under-response of 2.51 dB compared with the true noise power. For example, the true power of Rayleigh distribution voltage with variance of $\sigma^2$ may be $\overline{P}$, as provided below in (14).

$$\overline{P} = \int_0^\infty \left(\frac{V^2}{R}\right)\left(\frac{V}{\sigma^2}\exp\left(-\frac{V^2}{2\sigma^2}\right)\right)dv = \frac{2\sigma^2}{R} \quad (14)$$

From (14), the log-compressed Rayleigh distribution representing an average power $\overline{P}_{LR}$ may be provided by $$\overline{P}_{LR} = \frac{V_{LR}}{R} = \frac{2\sigma^2}{\exp(\gamma)R}.$$

The difference between the true power $\overline{P}$ and the average power $\overline{P}_{LR}$ may be −2.51 dB, as provided by $$\overline{P}_{LR}|_{dB} - \overline{P}|_{dB} = -\frac{10\gamma}{\ln(10)} = -2.507 \text{ dB}.$$

Based on the foregoing, if the MRSS result is processed in a logarithmic domain, the detected noise power may have an under-response of −2.51 dB. Therefore, after adjusting for an under-response of −2.51 dB, the detected noise floor $\mu_N$ may be as provided in (15).

$$\mu_N = -174 + NF + 10\log(f_{NBW}) - 2.51 \text{ (dBm)}. \qquad (15)$$

As shown by (15), the detected noise floor $\mu_N$ may be a function of system noise figure NF and a duration and shape of the window. Decreasing the duration of window may increase the detection time of MRSS, but at the expense of the increased noise floor $\mu_N$ and the decreased resolution. With the same duration of the window, the shape of the window may also affect the detected noise floor, but the selectivity of the signal may be affected as well because of the skirt characteristics of the window.

The averaged result of the detected noise power $f_{X,AVG}(x)$ may have a probability density function (pdf) as provided in (10). Therefore, the threshold level $P_{TH}$ having a false alarm rate of $P_{FA}$ may be found by calculating a cumulative density function of (10) and locating the point where the cumulative density function reaches $(1-P_{FA})$. For example, if the acceptable false alarm rate $(P_{FA})$ is 0.10, the threshold level $P_{TH}$ may be calculated as shown in (16). In particular, (15) may be obtained by finding a point to which integration of the cumulative density function of (10) has a value of $(1-P_{FA})=0.9$.

$$P_{TH} \approx \mu_{TH} + \frac{6.1265}{\sqrt{N_{AVG}}} \text{ (dBm)} \qquad (16)$$

Figure 4:
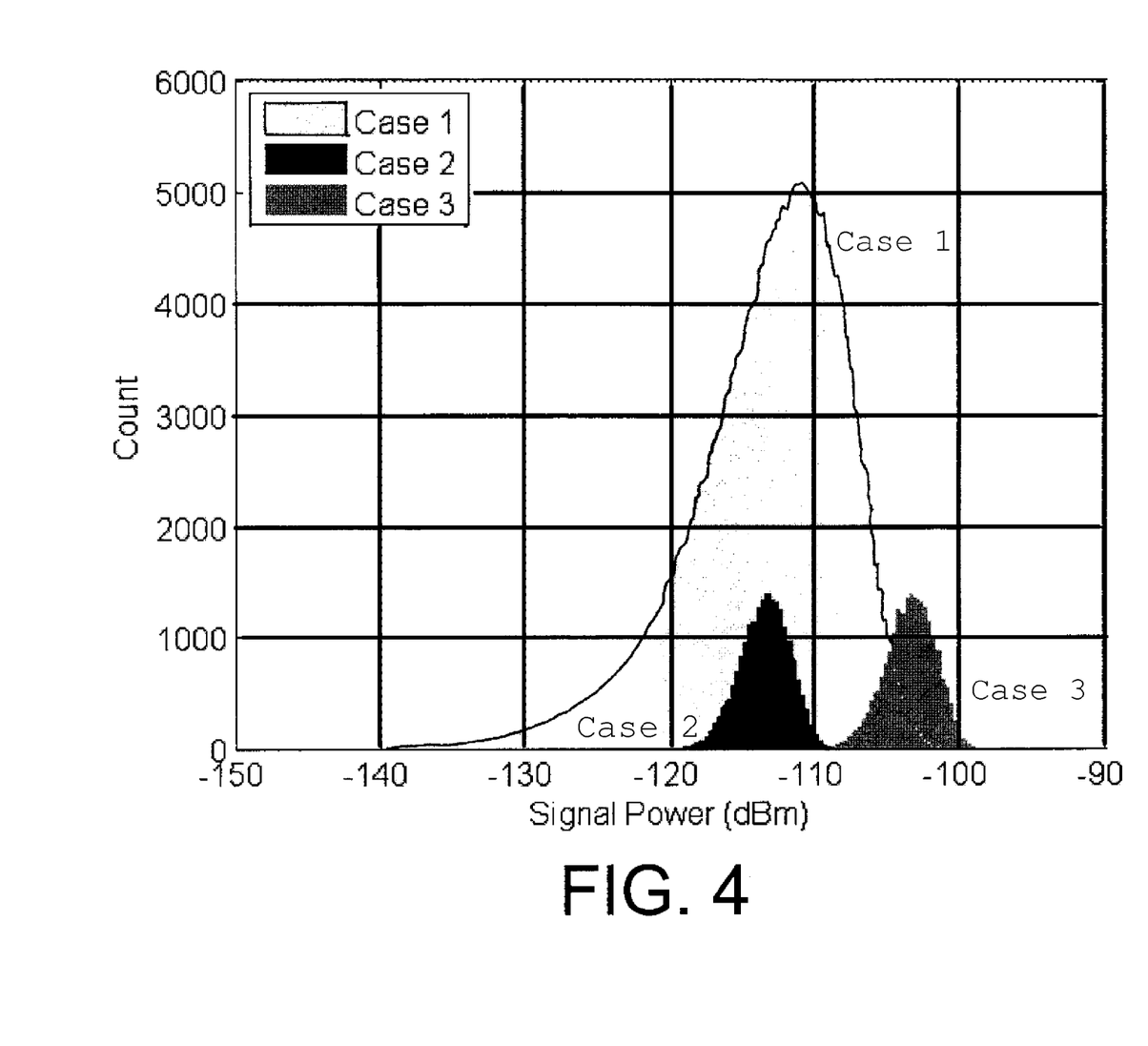
FIG. 4 shows an example histogram of the detected noise power over different duration of window and number of average, according to an example embodiment of the invention.

FIG. 4 shows the histogram of the detected noise power over different duration of windows and number of averages. The wideband white Gaussian noise may be generated with a power of $-164$ dBm/Hz, assuming a system noise figure of 10 dB. As shown in FIG. 4, there is a histogram of MRSS results for noise power measurement with $\cos^4(\pi f_w t)$ window. For Case 1, the window frequency $f_w$ may be set at 100 kHz, and the number of averages $N_{AVG}$ may be set to 1. In this case, the calculated mean $\mu_N$ may be $-113.62$ dBm, and the standard deviation $\sigma_N$ may be 5.55 dB, according to an example embodiment of the invention. For Case 2, the window frequency $f_w$ may be set to 100 kHz, and the number of averages $N_{AVG}$ may be set to 10. In this case, the mean $\mu_N$ may be $-113.62$ dBm and the standard deviation $\sigma_N$ may be 1.74 dB, according to an example embodiment of the invention. For Case 3, the window frequency may be set to 1 MHz, and the number of averages $N_{AVG}$ may be set to 10. In this case, the mean MN may be $-103.63$ dBm, and the standard deviation $\mu_N$ may be 1.76 dB, according to an example embodiment of the invention. It will be appreciated that the y-axis in FIG. 4 shows the number of occurrences over each 0.3-dB power range. The simulation of FIG. 4 may be based on 200,000 independent MRSS results for each case. Therefore, the case of $N_{AVG}=1$ has total of 200,000 points, while that of $N_{AVG}=10$ has total of 20,000 points.

Still referring to FIG. 4, the distribution of the detected noise power may be in compliance with the log-compressed Rayleigh distribution. In order to check the validity of (12) and (15), the mean and standard deviation of each result is calculated. It will be appreciated that for cases 1 and 2, the reduction of standard deviation due to the increase in number of averages corresponds well to (12). The shift of noise floor by 10 dB between case 2 and 3 may be attributed to the ten times increase of $f_{NBW}$, according to an example embodiment of the invention.

Figure 5:
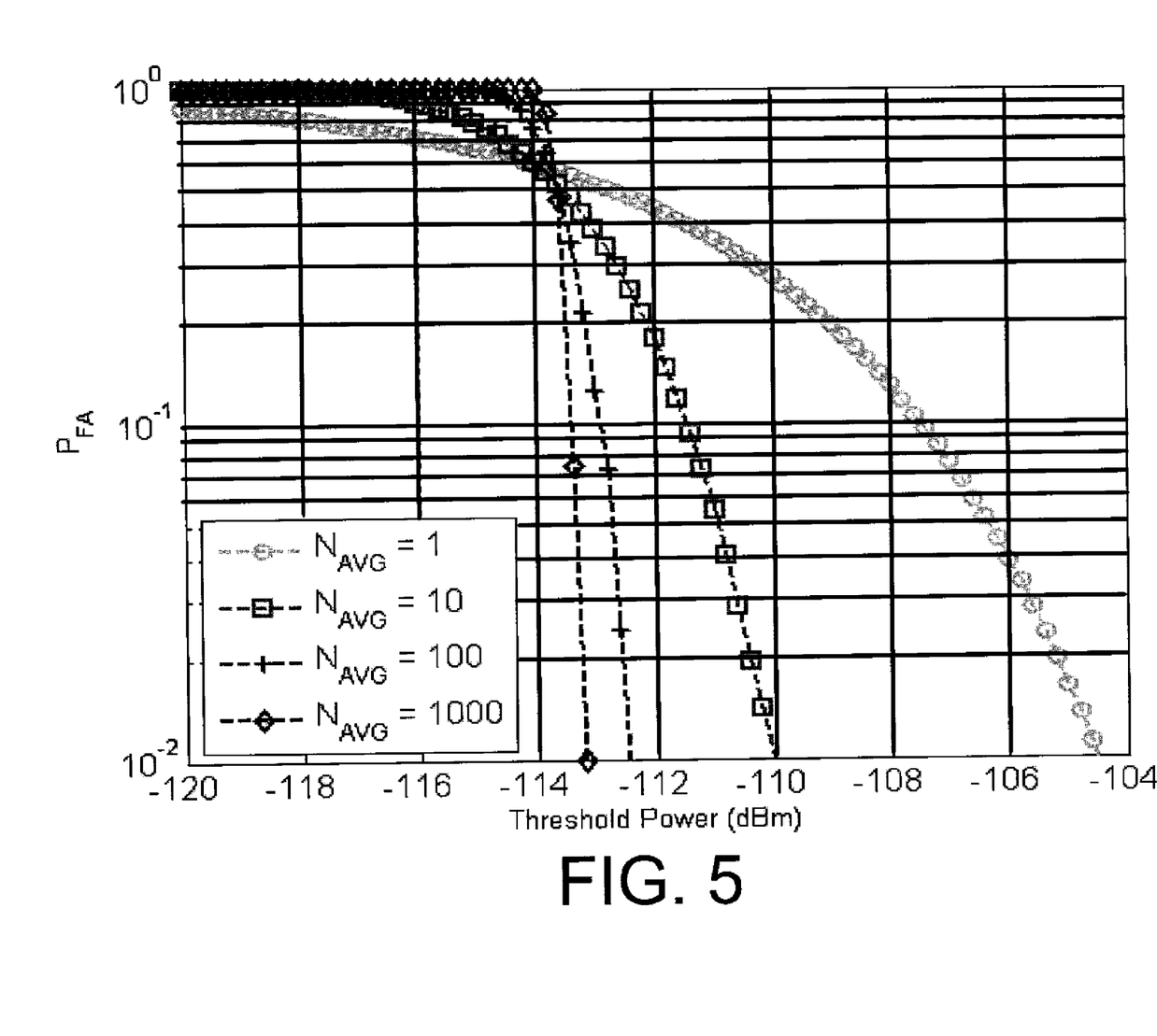
FIG. 5 illustrates an illustrative false alarm rate, with $\cos^4(\pi f_w t)$ window, $f_w$=100 kHz, and $N_{AVG}$=1, 10, 100 and 1000, according to an example embodiment of the invention.
Figure 6:
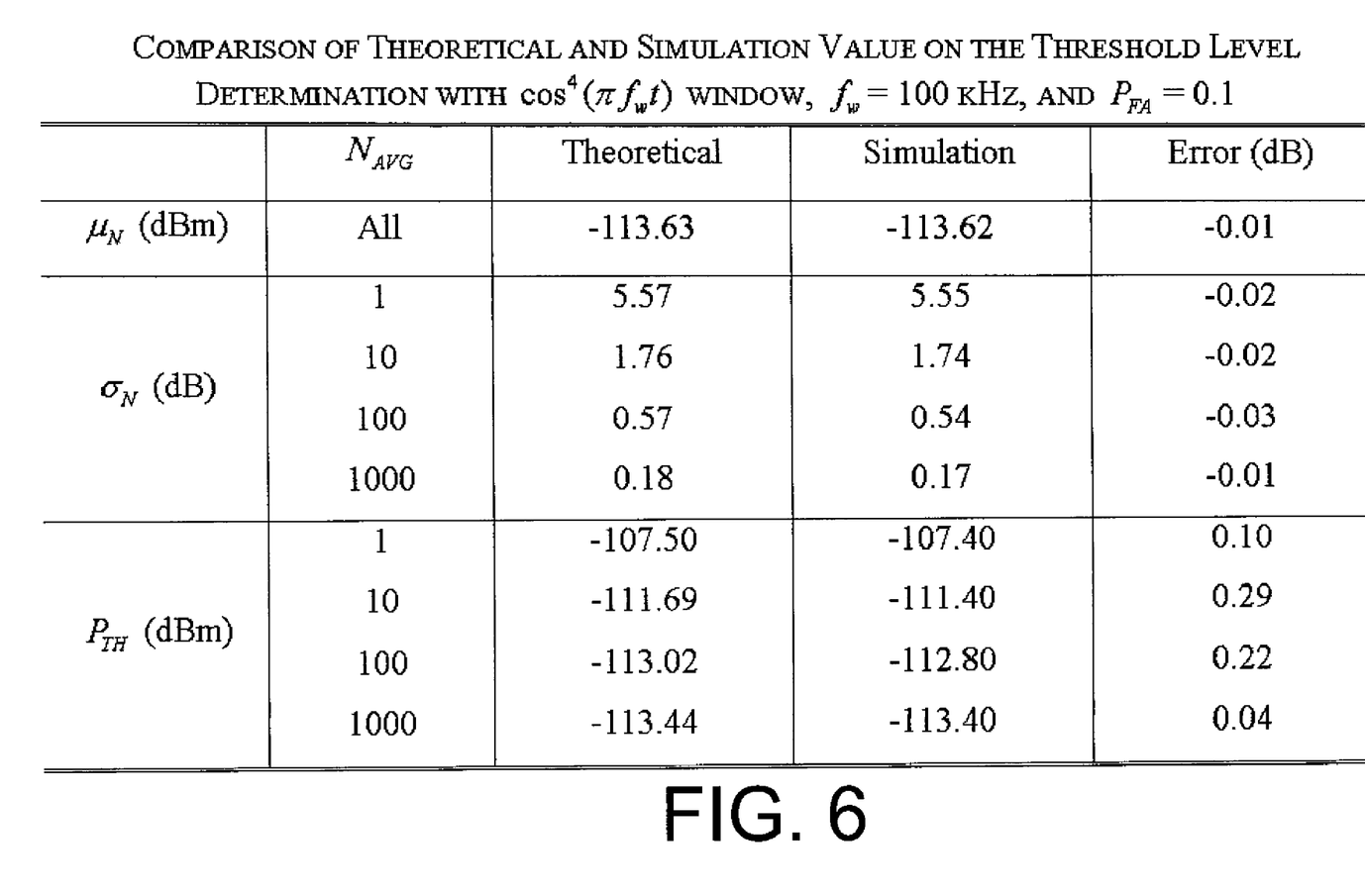
FIG. 6 illustrates an example comparison of theoretical and simulation values on the Threshold Level Determination with $\cos^4(\pi f_w t)$ window, $f_w$=100 kHz, and $P_{FA}$=0.1, according to an example embodiment of the invention.

FIG. 5 illustrates an example false alarm rate simulation result when $\cos^4(\pi f_w t)$ window with a frequency $f_w=100$ kHz and number of averages $N_{AVG}=1, 10, 100$ and 100. To find the false alarm rate, 200,000 independent MRSS results may be gathered and averaged according to the number of averages $N_{AVG}$. At each threshold level $P_{TH}$ (dBm), the total number of averaged results which are larger than the threshold level may be counted and divided by the total number of results to provide the false alarm rate $P_{FA}$ at that threshold. In accordance (16), it will be appreciated that the larger the number of averages $N_{AVG}$, the smaller the threshold level $P_{TH}$ that satisfy a certain false alarm rate $P_{FA}$. As shown in FIG. 5, for a false alarm rate $P_{FA}$ of 0.10, a threshold level $P_{TH}$ of approximately $-113$ dBm may be utilized where the number of averages $N_{AVG}=1000$. On the other hand, for the same false alarm rate $P_{FA}$ of 0.10, a threshold level $P_{TH}$ may be approximately $-107$ dBm where the number of averages $N_{AVG}=1$. FIG. 6 provides an example table that compares the theoretical and simulation results on the noise power distribution and threshold level determination. The error is found to be negligible, so the validity of the theoretical model may be confirmed, according to an example embodiment of the invention.

E. Example Probability of Misdetection

Figure 7A:
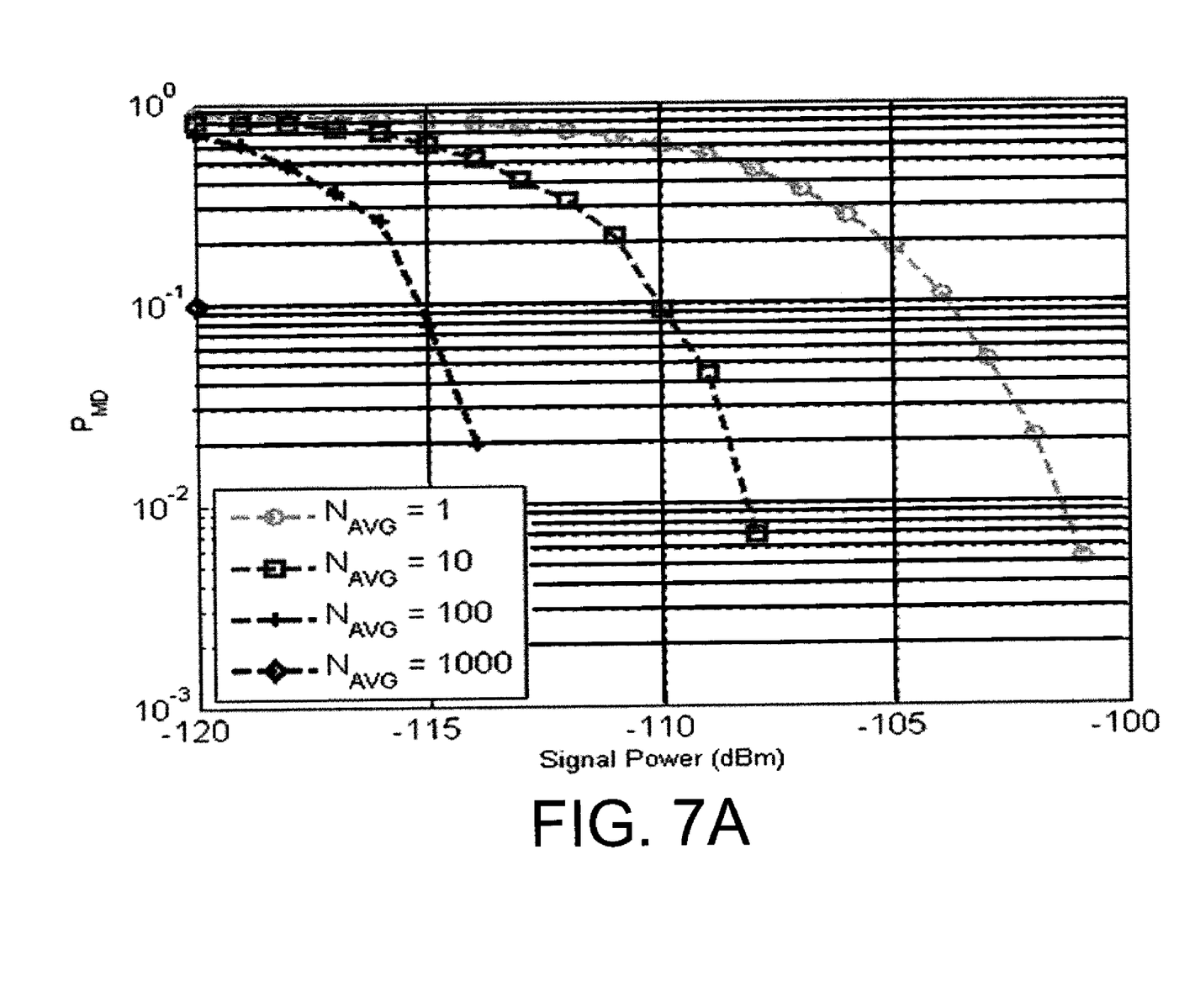
FIG. 7A illustrates an example probability of misdetection with $\cos^4(\pi f_w t)$ window having $f_w$=100 kHz which is modulated to 600 MHz and various $N_{AVG}$=1, 10, 100 and 1000 with the input signal being a CW signal at 600 MHz, according to an example embodiment of the invention.
Figure 7B:
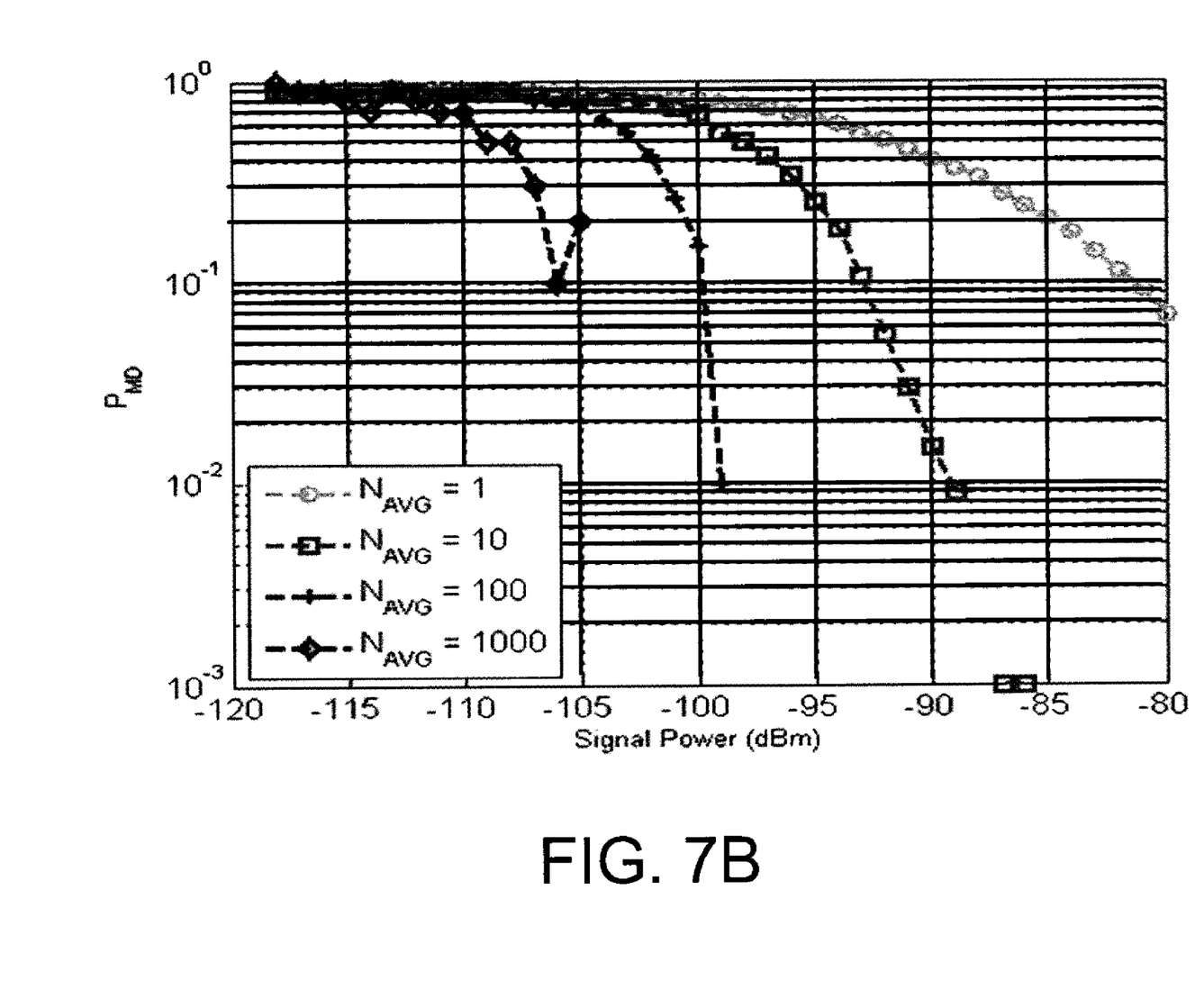
FIG. 7B illustrates an example probability of misdetection with $\cos^4(\pi f_w t)$ window having $f_w$=100 kHz which is modulated to 600 MHz and various $N_{AVG}$=1, 10, 100 and 1000 with the input signal being an ATSC signal at 600 MHz, according to an example embodiment of the invention.

Once the threshold level is determined, the probability of misdetection may be simulated as shown in FIGS. 7A and 7B. In FIGS. 7A and 7B, the simulated threshold level in FIG. 6 may be used as the sensing threshold level $P_{TH}$ for each number of averages $N_{AVG}$. The modulated window may be fixed as a $\cos^4(\pi f_w t)$ window with frequency $f_w=100$ kHz and modulated to $f_c=600$ MHz, according to an example embodiment of the invention.

FIG. 7A illustrates an example case where an input is a continuous-wave (CW) signal centered at 600 MHz, according to an example embodiment of the invention. The signal power (dBm) is varied from $-120$ dBm to $-101$ dBm, as shown in FIG. 7A. At each signal power, 10000 independent MRSS results are gathered and averaged with each $N_{AVG}$. As the number of averages $N_{AVG}$ is increased, the variance on the detected signal power is also reduced, so the probability of misdetection is also decreased, according to an example embodiment of the invention. As a CW signal is a delta function in a frequency domain, the detected power is not altered by the equivalent noise bandwidth of the window, and the detected power itself is the signal power of a CW signal.

FIG. 7B illustrates example case where an input signal is modulated with 8-VSB according to ATSC standard, centered at 600 MHz. The signal power shown in x-axis of FIG. 7B is the total signal power (dBm) over the bandwidth of 5.38 MHz. The digitally-modulated signals with random data having a symbol rate much faster than the resolution bandwidth of the window can be approximated to have a Gaussian distribution according to the central limit theorem. Therefore, the detected ATSC signal is also subject to the under-response of $-2.51$ dB with logarithmic processing. Thus, the detected signal power with an equivalent noise bandwidth of $f_{NBW}$ in case of the digitally modulated signal which is fast enough will be the following:

$$\mu_D = P_s - 10\log\left(\frac{f_{BW}}{f_{NBW}}\right) - 2.51 \text{ (dBm)} \qquad (17)$$

, where $\mu_D$ is the detected power, $P_S$ is the original signal power, and $f_{BW}$ is the signal bandwidth. According to an example embodiment of the invention, in the case of ATSC signal with $\cos^4(\pi f_w t)$ window having $f_w=100$ kHz, $$\mu_D = P_s - 10\log\left(\frac{5.38 \times 10^6}{1.94 \times 10^5}\right) - 2.51 = P_s - 16.94 \text{ (dBm)}. \quad (18)$$

As expected, the average of detected ATSC signal power is within 1-dB error with the value calculated from (18).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for threshold determinations for multi-resolution spectrum sensing (MRSS) in a cognitive radio, comprising:
   receiving a false alarm rate, wherein the false alarm rate is associated with false occupancy identifications of a spectrum segment;
   receiving multi-resolution spectrum sensing (MRSS) results associated with an analysis of a portion of a radio frequency (RF) spectrum using an MRSS window, wherein the MRSS results are correlation values representing a statistical correlation between the portion of the RF spectrum and the MRSS window;
   determining a noise floor as a function of a noise figure and characteristics of the multi-resolution spectrum sensing (MRSS) window; and
   calculating a sensing threshold of the cognitive radio based at least in part upon the false alarm rate and the noise floor.

2. The method of claim 1, further comprising determining whether a portion of the RF spectrum is occupied by comparing the MRSS results with the calculated sensing threshold.

3. The method of claim 2, wherein MRSS results exceeding the calculated sensing threshold results in determining that the portion of the RF spectrum is occupied.

4. The method of claim 1, wherein characteristics of the MRSS window include one or both of a duration or shape of the MRSS window.

5. The method of claim 4, wherein the duration of the MRSS window is a factor in the speed or resolution of spectrum sensing.

6. The method of claim 5, wherein the duration of the MRSS window is a factor in the noise figure.

7. The method of claim 6, wherein:
   decreasing the duration of the MRSS window increases the speed of the spectrum sensing, and
   increasing the duration of the MRSS window enhances the resolution of the spectrum sensing.

8. The method of claim 1, wherein the MRSS window is a window function having a particular window frequency $f_w$.

9. The method of claim 8, wherein the window function is $\cos^\alpha(\pi f_w t)$, wherein $\alpha$ is an integer value.

10. The method of claim 1, wherein the noise floor is a function of the number of averages of measured noise powers.

11. The method of claim 10, wherein increasing the number of averages reduces variation of the noise floor.

12. The method of claim 10, wherein increasing the number of averages reduces the calculated sensing threshold that satisfies the false alarm rate.

13. The method of claim 1, wherein the noise figure is associated with noise power due to the system noise contributions.

14. A system for multi-resolution spectrum sensing in a cognitive radio, comprising:
   an antenna for receiving a portion of a radio frequency (RF) spectrum; and
   a multi-resolution spectrum sensing module, wherein the spectrum sensing module receives a false alarm rate, wherein the false alarm rate is associated with false occupancy identifications of a spectrum segment;
   determines a noise floor as a function of a noise figure and characteristics of a multi-resolution spectrum sensing (MRSS) window, wherein MRSS results are correlation values representing a statistical correlation between the portion of the RF spectrum and the MRSS window; and
   calculates a sensing threshold of the cognitive radio based at least in part upon the false alarm rate and the noise floor.

15. The system of claim 14, wherein the spectrum sensing module is further operative to:
   receive MRSS results associated with an analysis of at least a portion of the RF spectrum; and
   determine whether the portion of the RF spectrum is occupied by comparing the MRSS results with the calculated sensing threshold.

16. The system of claim 14, wherein the noise power is a function of the number of averages of measured noise powers.

17. The system of claim 16, wherein increasing the number of averages reduces the sensing threshold that satisfies the false alarm rate.

* * * * *